(12) United States Patent
Ramapujam et al.

(10) Patent No.: US 6,801,348 B2
(45) Date of Patent: Oct. 5, 2004

(54) METHOD AND SYSTEM FOR RECORDING OF INFORMATION ON A HOLOGRAPHIC MEDIUM

(76) Inventors: P. S. Ramapujam, c/o Riso National Laboratory, P.O.Box 49, DK-4000 Roskilde (DK); Soren Hvilsted, c/o Technical University of Denmark, DK-2800 Kgs. Lyngby (DK); Pál Koppa, Reáltanoda u. 16, H-1053 Budapest (HU); Emöke Lörincz, Gombocz Zoltán u. 3, H-1118 Budapest (HU); Gábor Szarvas, Zab u. 8, H-1033 Budapest (HU); Péter Richter, Mátyás u. 18, H-1093 Budapest (HU); Peter Toth, Televägen 6, S-374 52 Asarum (SE)

(*) Notice: Subject to any disclaimer, the term of this patent is extended or adjusted under 35 U.S.C. 154(b) by 0 days.

(21) Appl. No.: 10/182,030
(22) PCT Filed: Feb. 7, 2001
(86) PCT No.: PCT/HU01/00016
§ 371 (c)(1), (2), (4) Date: Dec. 4, 2002
(87) PCT Pub. No.: WO01/57602
PCT Pub. Date: Aug. 9, 2001

(65) Prior Publication Data
US 2003/0137706 A1 Jul. 24, 2003

(30) Foreign Application Priority Data
Feb. 7, 2000 (HU) .............................................. 0000532

(51) Int. Cl.$^7$ ................................................. G03H 1/00
(52) U.S. Cl. .............................. 359/34; 399/30; 385/10; 385/24; 385/37; 385/131
(58) Field of Search .............................. 399/34, 32, 30, 399/31; 385/10, 34, 24, 129, 131

(56) References Cited

U.S. PATENT DOCUMENTS 6,556,531 B1 * 4/2003 Yagi et al. ................... 369/103

* cited by examiner

Primary Examiner—Drew A. Dunn
Assistant Examiner—Fayez Assaf
(74) Attorney, Agent, or Firm—McDonnell Boehnen Hulbert & Berghoff LLP (57) ABSTRACT

There is disclosed a method for the holographic recording of data, wherein a hologram containing the date is recorded in a waveguide layer (3). The holograms are formed in a layer structure containing multiple waveguide layers (3). Coupling means (12) are provided for selectively coupling the reference beam (11) into the single waveguide layers (3) of the layer structure. The invention also relates to an arrangement for holographic recording of data, comprising a data storage medium with a waveguide holographic storage layer, and an optical system for writing and reading the holograms. The optical system comprises means for imaging an object beam (5) and a reference beam (11) on the storage medium. The arrangement comprises multiple waveguide holographic storage layers (3) in the storage medium, and means for selectively coupling the reference beam (11) into the single waveguide layers (3) of the layer structure.

21 Claims, 8 Drawing Sheets

METHOD AND SYSTEM FOR RECORDING OF INFORMATION ON A HOLOGRAPHIC MEDIUM

TECHNICAL FIELD

The object of the invention is a method for the holographic recording of data. In the method a hologram containing the date is recorded in a waveguide layer as an interference between an object beam and a reference beam. The object beam is essentially perpendicular to the plane of the hologram, while the reference beam is coupled in the waveguide. There is also proposed an apparatus for performing the method. The apparatus comprises a data storage medium with a waveguide holographic storage layer, and an optical system for writing and reading the holograms. The optical system comprises means for producing an object beam and a reference beam, and imaging the object beam and a reference beam on the storage medium.

BACKGROUND ART

Storage systems realised with tapes stand out from other data storage systems regarding their immense storage capacity. Such systems were used to realise the storage of data in the order of Terabytes. This large storage capacity is achieved partly by the storage density, and partly by the length of the storage tapes. The relative space requirements of tapes are small, because they may be wound up into a very small volume. Their disadvantage is the relatively large random access time.

The random access time may be decreased, or the capacity may be increased with the same random access time, if the data storage is not only done in the plane of the storage medium, but also in depth (so-called 3D or three-dimensional storage). Optical data storage offers several possibilities for 3D storage. One possible way is the solution used in multi-layered CD-s, or the DVD. In this case the data storage planes are spaced apart by some tens of $\mu$m-s. The applied optical system has a large numerical aperture, with a depth resolution of approx. 1 $\mu$m, and a precise focus servo system allows the selective readout of the layers placed beneath each other.

Another solution is known from the area of holographic data storage. In this case the data are stored as thick holograms (Bragg holograms). Here the "depth addressing", i.e. the separation of the holograms recorded into the same physical volume, may be achieved with the Bragg conditions. This is known as angle-, wavelength-, displacement- etc. multiplexing. In the experimental holographic storage systems in the laboratories primarily crystals are used as storage medium (Fe doped $LiNbO_3$). This finds only limited applications, due to considerations of manufacturing technology, and may not be used at all for tape storage systems. For this purpose only a polymer type material is feasible.

Polymer based materials are normally produced in large quantities, relatively easily, and are easily fixed on a substrate. Known optical storage materials are the so-called side-chain polymers, and their use in holograms is also known. Another important property of these polymers is that no post-exposure treatment is necessary, e.g. no subsequent development, thermal or electrical fixing process. This is a very important issue in all practical data storage technology.

It has been shown experimentally that so-called side-chain polymers are excellently suitable for optical data storage purposes. Thin polarisation holograms may be recorded in side-chain polymers with a theoretical 100% efficiency. However, in order to record Bragg holograms that are suitable for spatial (three-dimensional) storage, at least 25–50 $\mu$m thick holographic storage material is necessary. Polymer materials with such thickness undergo substantial deformation (as a result of the change in temperature, mechanical impacts, humidity, etc.). The deformation of the holographic storage layer will cause the deformation of the lattice in the hologram, and this will in turn lead to a decrease in diffraction efficiency. As the layer thickness increases, and the lattice deformation increases therewith, beyond a certain threshold the thick hologram will deteriorate, and finally it will be unreadable. On the contrary, thin holograms are much less sensitive to the deformation of the holographic lattice.

Therefore, it is an object of the present invention to provide a structure, which allows the recording of multiple holograms within the same unit area of the data storage medium, and at least partly eliminates the problems above. With the invention a data storage structure is suggested, which allows in-depth data storage in case of thin polymer storage materials. The suggested solution combines the advantages of thin holograms (insensitivity to lattice deformation) with the advantages of thick holograms (three-dimensional, in-depth storage, large data density).

SUMMARY OF THE INVENTION

According to the method of the invention, a hologram containing the data is recorded in or in the vicinity of a waveguide layer as an interference between an object beam- and a reference beam, where the object beams is essentially perpendicular to the plane of the hologram, while the reference beam is coupled into the waveguide. According to the invention, the holograms are formed in a layer structure containing multiple waveguide layers, and coupling means are provided for selectively coupling the reference beam into the single waveguide layers of the layer structure.

In a preferred realisation of the method a grating is used as the coupling means. Advantageously, gratings with different pitch and/or profile are used in the different waveguide layers, and the reference beam is projected at different incidence angles on the coupling means, i.e. the gratings.

Alternatively, gratings with different orientation may be used in the different layers. In this case the reference beam is projected from different directions onto the coupling means, where the projections of the different directions projected on the plane of the data storage medium are also different.

The invention also relates to an arrangement or system for holographic recording of data. The system comprises a data storage medium with a waveguide holographic storage layer, and an optical system for writing and reading the holograms. The optical system comprises means for producing an object beam and a reference beam, and imaging the object beam and a reference beam on the storage medium. According to the invention, the arrangement comprises multiple waveguide holographic storage layers in the storage medium, and further comprises means for selectively coupling the reference beam into the single waveguide layers of the layer structure.

In a preferred embodiment, the optical system comprises means for projecting the reference beam onto the coupling means from different incidence angles. In this case it is particularly advantageous if the coupling means comprises gratings with different pitch and/or profile in the different layers.

In a further preferred embodiment, the optical system comprises means for projecting the reference beam onto the coupling means from different directions, where the projections of these different directions in the plane of the data storage medium are also different from each other, i.e. the components of the directions falling in the plane of the data storage medium point in different directions in that plane. For this arrangement it is suggested that the coupling means comprises gratings with different orientation in the different layers.

In a further particularly preferred embodiment, it is foreseen to use a tape as the data storage medium. In order to facilitate the smooth readout of the running tape, in a particularly preferred embodiment the optical system is positioned in a rotating cylinder, where the cylinder is guiding the tape. In order to provide a continuous readout of the data on the tape, in an advantageous embodiment there is provided multiple optical systems within the cylinder.

The invention also concerns the waveguide structures used in the optical system of the invention.

BRIEF DESCRIPTION OF DRAWINGS

The invention will be now explained in detail with reference to the accompanying drawings, where.

BEST MODE FOR CARRYING OUT THE INVENTION

Figure 1A:
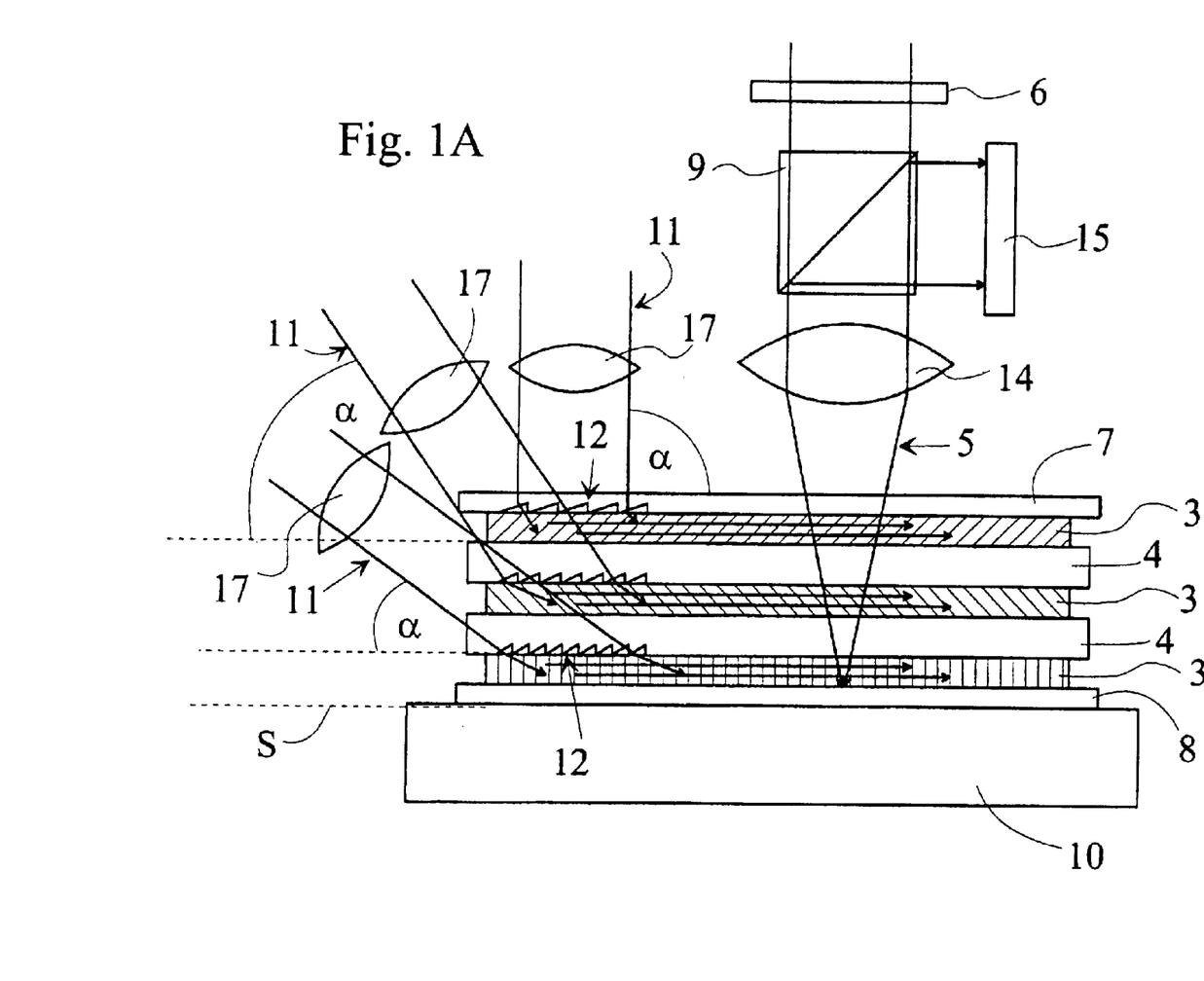
FIG. 1A illustrates the principle of the multi-layered holographic data storage, and the multi-layered storage medium, the latter in cross-section.

The principal scheme of the multi-layered hologram structure is shown in FIG. 1A. The basic element of the system is a so-called waveguide hologram. Essentially, this means that the hologram is recorded in a waveguide layer 3. The waveguide layer 3 is made of a light sensitive storage material with approx. 0.5–2 $\mu$m thickness, which is sandwiched between two spacer layers 4. The thickness of the spacer layers 4 is approx. 5–10 $\mu$m, and their refractive index is smaller than that of the waveguide layer 3. The system will work well if the difference between the refractive indices—usually denoted by $\Delta n$—is in the order of 0.01 and 0.001. There may be as much as 10–30 waveguide layers and spacer layers stacked on each other, but only three waveguide layer 3 is shown in FIG. 1, for simpler illustration. The waveguide layers 3 are separated by two spacer layers 4 in FIG. 1. The external surface of the layer structure, i.e. the top waveguide layer 3 is covered by the protective layer 7, while there is a mirror 8 under the bottom waveguide layer 3. The whole layer structure is supported mechanically by the substrate 10.

A common object beam 5 is used for recording the holograms in the waveguide layers 3. This object beam 5 is the Fourier transformed image of spatially modulated light beam. The modulation is made by a spatial light modulator (SLM) 6. The object beam 5 falls through a beam splitter 9 perpendicularly onto the layer system consisting of the waveguide layers 3 and the spacer layers 4. The layer system is placed in the Fourier plane, or at least in its vicinity. The same object beam is used for all layers. With other words, the object beam 5 travels through all waveguide layers 3, i.e. through all light sensitive layers.

The reference beam 11 is a guided plane wave travelling in one of the waveguide layers 3 of the layer system. One of the basic ideas of the invention is the provision of coupling means for selectively coupling the reference beam 11 into the individual waveguide layers 3. According to the invention, in one preferred embodiment this is made by coupling the 11 reference beam into the selected waveguide layer 3 by an appropriately formed grating 12. The gratings 12 in the waveguide layers 3 beneath each other all have different periodicity (pitch), i.e. the distance between two lines of the grating is different. The selection or addressing of the holograms 13 placed beneath and above each other is made by selecting a different incidence angle $\alpha$ for the reference beam 11 relative to the plane of the substrate. The incidence angle $\alpha$ will also be termed as reference angle hereinafter. To a grating 12 with a given periodicity there is a given reference angle, which will result in an efficient coupling into the waveguide layer, and will result in an effective guided plane wave. The energy coupled into the other waveguide layers 3 is several orders less.

The waveguide layers 3 may be single mode or multi-mode waveguides, they may all have the same thickness or they may also have slightly different thickness. If there are single mode waveguide layers with equal thickness, there is a grating with a different periodicity (pitch) and/or different profile for each waveguide layer. If there are multimode waveguide layers with slightly different thickness, the periodicity of the coupling gratings 12 may be the same, and in this case the selection or addressing of the given waveguide layers 3 is made by selecting a proper incidence angle $\alpha$ of the reference beam 11, which latter is imaged on the layers by an objective lens 17. This system allows simpler manufacture of the gratings, but the profiles of the gratings 12 can not be optimised for a given coupling direction. This may result in the decrease of the coupling efficiency.

The incidence angle $\alpha$ of the reference beam 11 may be varied by several methods. Firstly, it is contemplated to use an optical system with a mechanically positioned objective lens 17, to which the necessary light power is guided by an optical fibre bundle. Alternatively, the optical system used in the arrangement of the invention could have a separate objective lens 17 for the different reference beams 11 having a different incidence angle $\alpha$, and the necessary light power could be coupled to all objective lenses 17 from the common coherent light source. In this case the light beams through the not used objective lenses 17 may be switched off by a controlled optical switch (not shown).

The simplest method for producing the coupling gratings 12 may be by pressing or rolling the appropriate grating profile into the spacer layers 4 or into the waveguide layers 3. This process is very similar to the manufacturing technology of security holograms. When produced in large quantities, the manufacturing of the gratings 12 may be done very cost-effectively.

During recording, a 13 hologram will be formed in the light sensitive waveguide layer 3, as an interference pattern between the object beam 5, falling perpendicularly to the plane S of the data storage medium, and between the reference beam 11, which is guided form the side into the waveguide layer 3. The light intensity will result in a change of the transmission or the refractive index of the light sensitive storage material. In the first case we speak of a so-called amplitude hologram, while in the second case a so-called phase hologram is recorded. If the change in the refractive index or transmission induced by the light beam is also dependent of the polarisation state of the light beam, then a so-called polarisation hologram may be recorded in the storage medium. If the waveguide layer 3 is made from a material that is sensitive to the polarisation of the light, then the object beam 5 and the reference beam 11 are constituted by two mutually perpendicularly polarised light beams.

Various polymers are particularly suitable for recording the waveguide holograms 13. The advantage of polymers is that they do not need any kind of post-treatment, development, fixation, thermal or electrical recording after the exposure of the holograms 13, as opposed to many other holographic storage materials. Polymers may be produced cost-effectively in large quantities. The matching of the different types of polymers for the creation of the layer system is a relatively easy task (e.g. the substrate 10, the spacer layer 4, the waveguide layer (storage layer) 3 and the protective layer 7 may all be made of different types of polymers). The so-called side chain or liquid crystal polymer materials are particularly suitable for the recording of polarisation waveguide holograms.

Since the object beam 5 will travel during writing through all waveguide layers 3, it will also modify or change those layers as well, into which the reference beam 11 actually is not coupled into. In erasable and re-writable holographic storage materials the object beam 5 will erase to a small extent the previously stored holograms in the layers which are momentarily not addressed by the reference beam 11. This effect is similar to the effect experienced when holograms are multiplexed.

For multiplexed holograms various exposure techniques have been developed to prevent the erasure of the previously recorded holograms. These are mostly based on the overexposure of the holograms recorded earlier, while the newer holograms are recorded with a continuously decreasing energy, for gradually diminishing the erasing effect. In the end, when all holograms have been recorded, all holograms will have approximately equal diffraction efficiencies. Depending of the type of the holographic material, the exposure strategy and the allowed spread (variation) of the diffraction efficiency, the number of multiplexed holograms may be between several tens and several thousands. In case of the waveguide holograms 13 recorded in the multi-layer structure according to the invention, essentially the same factors limit the useful number of layers, namely the erasing effect when the multiplexed holograms are recorded. The maximum allowable number of the waveguide layers 3—i.e. the number of multiplexed holograms recorded in the same area of the layer structure—may be optimised by applying a special exposure strategy tailored to the properties of the applied storage material. In case of the suggested side-chain polymers, approximately five to ten layers may be placed on each other with the present level of technology.

During readout of the data recorded with the method of the invention, the coupling grating 12 is illuminated with an appropriately directed reference beam 11. The guided reference beam 11 in the waveguide layer 3 will diffract on the stored waveguide hologram 13, and will create a light beam having the same properties as the object beam 5 used during the writing stage, i.e. the diffracted reference beam 11 will re-create the Fourier-transform of the light intensity distribution created by the SLM 6. The mirror 8 under the layer structure will reflect the re-created Fourier-transform into the same objective lens 14 which was also used in the writing step. The read image is coupled out onto a detector matrix 15 by a beam splitter 9, which is typically the same beam splitter that was also used in the recording process.

Figure 1B:
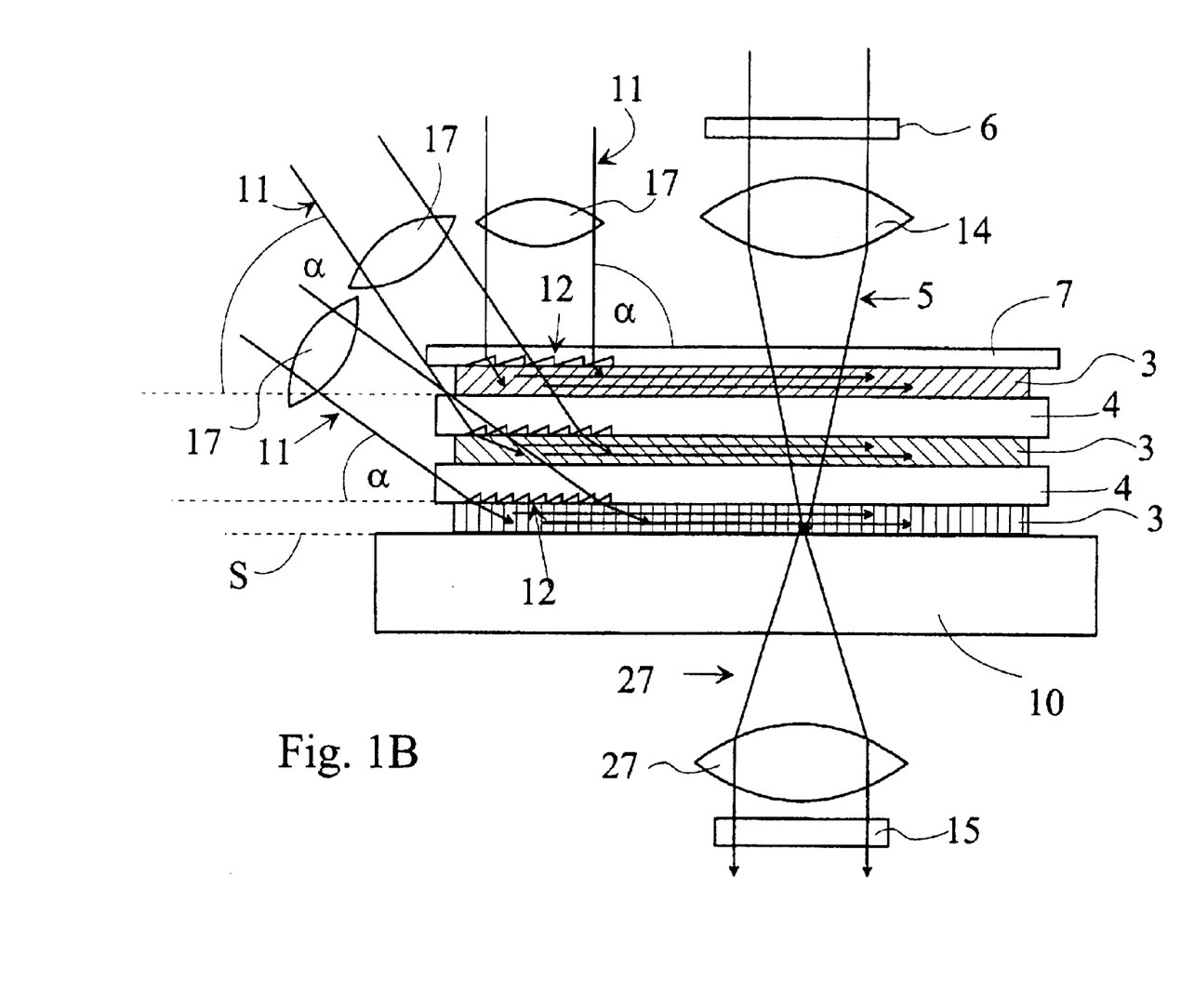
FIG. 1B is a modified version of the optical setup shown in FIG. 1A

With an other possible embodiment shown in FIG. 1B, there is no mirror 8 under the layer system, and the substrate 10 is transparent. The diffracted readout beam 26—i.e. the reconstructed Fourier transform of the light beam which passed through the SLM—passing through the transparent substrate 10 is transformed back by another Fourier objective 27 and images the readout beam 26 on a detector matrix 15 positioned on the other side of the substrate 10.

Figure 2A:
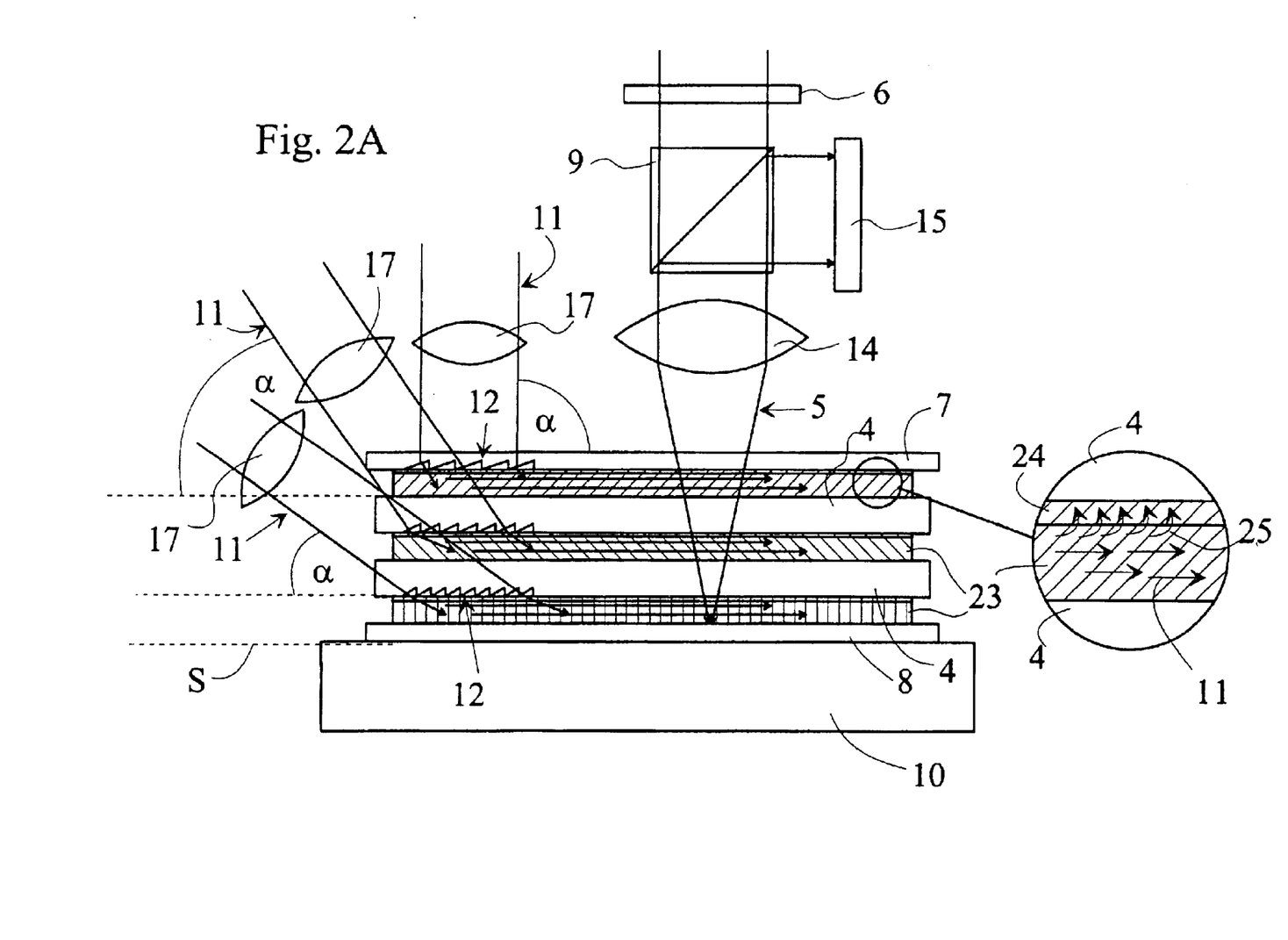
FIG. 2A is another modified version of the arrangement shown in FIG. 1A.
Figure 2B:
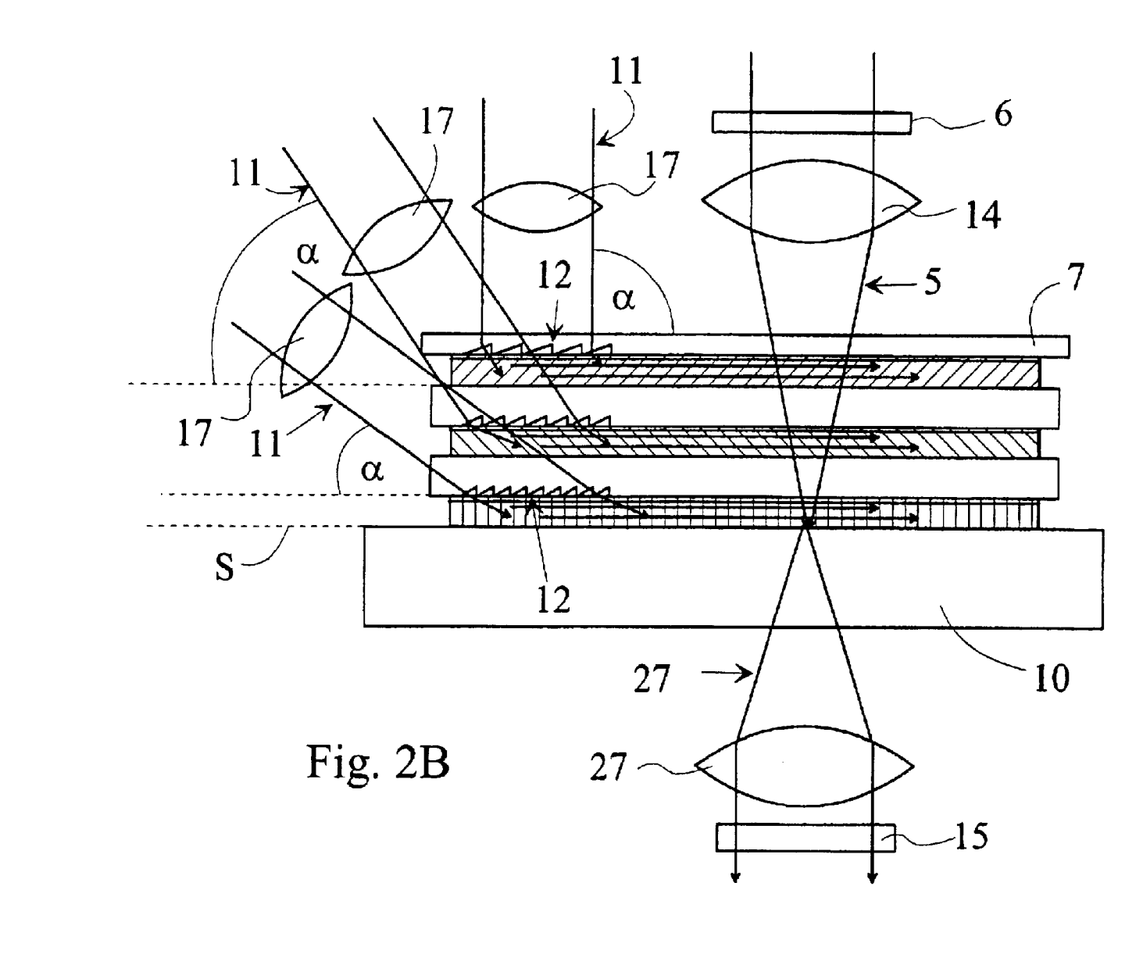
FIG. 2B is a modified version of the optical setup shown in FIG. 2A

Both in the latter described transmission mode and in the reflection mode described in FIG. 1A, the layer system may be realised slightly differently. This modified layer structure is illustrated in FIGS. 2A and 2B. The arrangement shown in 2A has a substrate with a mirror layer 8, while the arrangement in FIG. 2B is one with a transparent substrate, where the readout detector 15 is opposite to the side of the incident object beam 5. In this case the waveguide layer 23 is made of a material that is not sensitive to light. The holograms are recorded in a light sensitive layer 24 adjacent directly to the waveguide layer 23. With other words, in this case the hologram containing-the data is recorded not in the waveguide layer directly, but only in its vicinity. The light sensitive layer 24 may be on both sides of the waveguide layer 23, or on just one side, as it is shown in FIGS. 2A and 2B. As previously, the reference beam 11 travels essentially in the waveguide layer 23. However, in the vicinity of the waveguide layer 23 an exponentially decreasing electromagnetic field will be formed, which is also termed as evanescent wave. This evanescent wave 25 extends into the thin light sensitive layer 24 situated directly beside the waveguide layer 23 for a distance in the order of the applied wavelength. With other words, the evanescent wave 25 will enter the actual storage material, the light sensitive layer 24. At the same time, the object beam 5 will travel perpendicularly to the layers, as in the previous case. The interference pattern between the object beam 5 and the evanescent wave 25 extending from the addressed waveguide layer 23 into the light sensitive layer 24 will record a hologram in the light sensitive layer 24. Depending on the chosen storage material, the hologram may be an amplitude-, phase-, or polarisation hologram.

When recording a hologram with a reference beam 11 utilizing the principle of the evanescent wave 25, the layer system may be made of two or three different materials. With three different materials, the waveguide layer 23 has the largest refractive index, and a thickness of 1–2 μm. The light sensitive storage layer 24 is approx. 1–2 μm thick, while the spacer layer 4 is approx. 10 μm thick. The refractive index of the latter two layers is smaller than that of the waveguide layer 23. This layer structure has the advantage that the key properties of the layers (waveguide, spacer, storage layer), and the material constants may be optimised separately.

Figure 3:
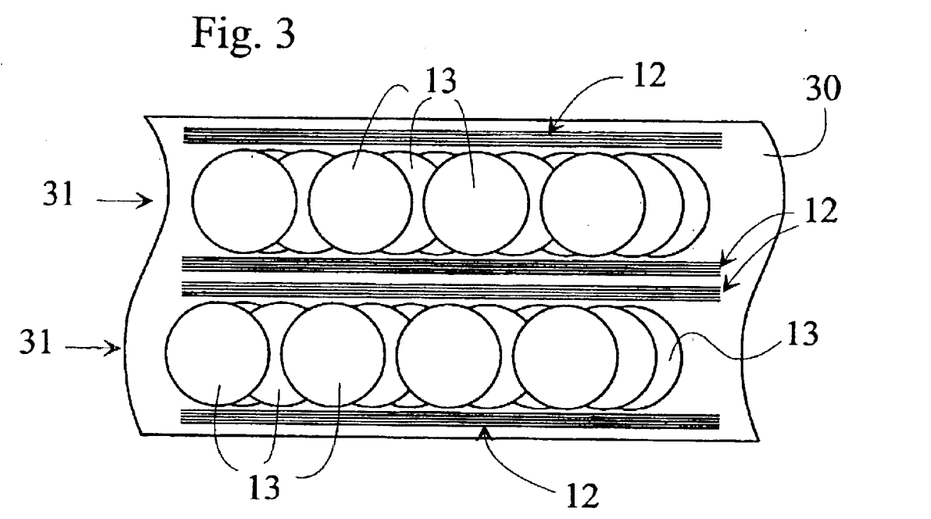
FIG. 3 is a schematic top view of the storage medium of FIG. 1.
Figure 4:
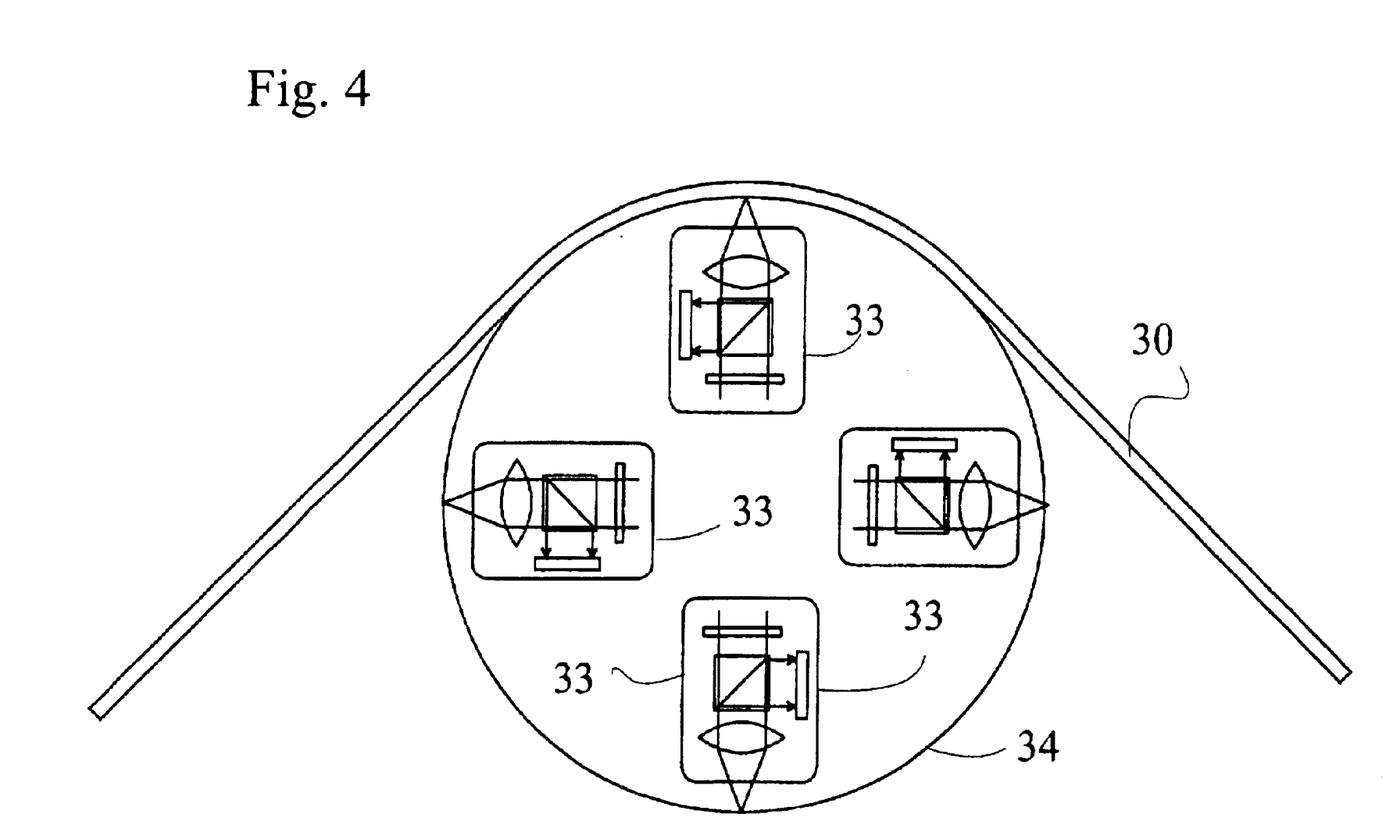
FIG. 4 is a principal scheme of a read-write optical system used with the storage medium of FIGS. 1A–B and 2A–B.

A practical realisation of the method according to the invention is illustrated with reference to FIGS. 3 and 4. FIG. 3 shows the structure of the storage medium of a tape-based optical storage system, i.e. the structure of an optical tape 30, while FIG. 4 shows an arrangement suitable for the writing and reading of data to and from the tape 30 shown in FIG. 3.

The multi-layered waveguide holograms suggested by the invention are particularly well suited for optical tape storage systems with a large storage capacity. In a possible embodiment the holograms 13 within each layer are positioned beside each other in multiple lines 31, extending along the length of the tape 30, i.e. there are several lines parallel to each other in the width of the tape 30. As an example, two lines 31 are shown in FIG. 3. When the holograms 13 are positioned in several lines 31, the number of the write/read heads 33 may be equal to the number of lines 31. In this case the write/read heads 33 may be shifted relative to each other along the length of the tape 30.

Considering that the Fourier-plane is theoretically invariant to the displacements in the X-Y direction (the displacements in the plane of the 13 hologram), with an optical system having appropriate imaging properties it is allowable to shift the optical axis of the write/read head 33 relative to the theoretical centre of the hologram 13 actually being read, with a distance corresponding to approx. one tenth of the size of the hologram (its size in the plane of the hologram, i.e. one tenth of its width or length). This is important because this means that the holographic data storage system proposed by the invention do not need special manufacturing and positioning tolerances, and do not need any complicated servo system that would be otherwise required to produce an exact tracking of the lines 31. During readout, the tape 30 need not be stopped for each hologram 13, but the tape 30 may move continuously relative to the write/read head 33.

With another possible embodiment, a single write/read head 33 may read several lines 31. In this case the write/read head 33 must be provided with positioning means, for movement perpendicularly to the longitudinal direction of the tape 30.

The individual holograms 13 may be positioned so as to cover each other completely when viewed from above. If the holograms cover completely, the tape 30 must stop relative to the write/read head 33 during both reading and writing. However, with a different approach, it is also possible for the tape 30 to move continuously at least during reading. The readout is effected with a short laser pulse, which starts when the hologram 13 to be read is exactly at the optical axis of the write/read head 33. The holograms 13 above and under each other are slightly shifted relative to each other in the longitudinal direction of the tape 30, as it is also perceived from FIG. 3. The amount of the shift is equal to the distance covered by the moving tape during the readout time (i.e. the duration of the readout pulse). In this manner when the next image is read, the next hologram 13 is positioned in the field of view of the optical system.

Even in this arrangement the write/read head 33 and the tape 30 must stand still relative to each other during writing. This arrangement provides the advantage that the tape may move continuously during readout, and there are no sudden stops and large accelerations, and the overall mechanical stress on the tape is smaller. Since the writing is a slower process than the reading, the mechanical stresses are smaller already.

According to the invention, a further arrangement is proposed for substantially increasing the writing speed. This is achieved with an optical system where the tape 30 need not be stopped during writing. This suggested embodiment is also advantageous because the continuous movement will not impose hard wear on the tape 30. For this purpose, the write/read head 33 and the area of the tape being written must be stationary relative to each other during the writing process. One possible solution is to mount the write/read head 33 within a rotating drum or cylinder 34. This arrangement is shown schematically in FIG. 4. The tape 30 is guided by the periphery of the cylinder 34, without slipping. The wall of the cylinder 34 is transparent under the objective of the write/read head 33. The object beam leaving the objective and the reference beam leaving the separate reference optics enters the tape 30, which latter is standing still relative to the objective lens (in fact, they rotate together). As a result, the object beam and the reference beam will produce a clear, well-defined and distortion-free interference pattern, and the stored holograms will be well readable.

As it is seen in FIG. 3., for one half of the holograms 13 above each other on the tape 30, the coupling gratings 12 are assigned from the right side, while to the other half from the left side. In this manner the number of holograms 13 that may be addressed independently from each other with a good coupling efficiency may be twice the number of the different coupling gratings 12. This means that assuming a limited entry angle interval for the reference beams, the selectivity of the reference beams is better, with other words, the ratio between the intensity coupled into the selected waveguide and the intensity coupled into the neighbouring waveguides (i.e. the "parasitic" intensities due to scattering effects) is better. With other words, the cross-talk between the holograms above each other will be less.

A tape-based optical storage system applying the inventive principle may provide substantial data storage capacity. Feasible and experimentally proven, relatively simple optical systems and existing storage materials (e.g. the mentioned side-chain polymers) allow the realisation of approx. 1.5 bit/$\mu m^2$ data density. With off-the-shelf, available SLMs, (e.g. with 320×240 or 512×512 pixels), the size of one hologram could be a few tenth of a millimetre. Practically, four rows of coupling gratings may be arranged on an optical tape with 2 mm width. Calculated with the full width of the tape, the total data density could be approx. 1 bit/$\mu m^2$. With other words, in one millimetre length of the tape the capacity is approximately. 2000×1000=200 Kbytes. Assuming tens layers above each other results in the theoretical storage capacity of 2 Mbytes/mm tape. A 30 m long tape would have the capacity of approx. 60 Gbyte. It must be noted that this theoretical value is the so-called raw capacity. The necessary error coding, control bits, etc. will reduce the practically useful capacity to 50–60% of the raw capacity, assuming the usual data coding algorithms and data organising methods (file and directory structure).

Figure 5:
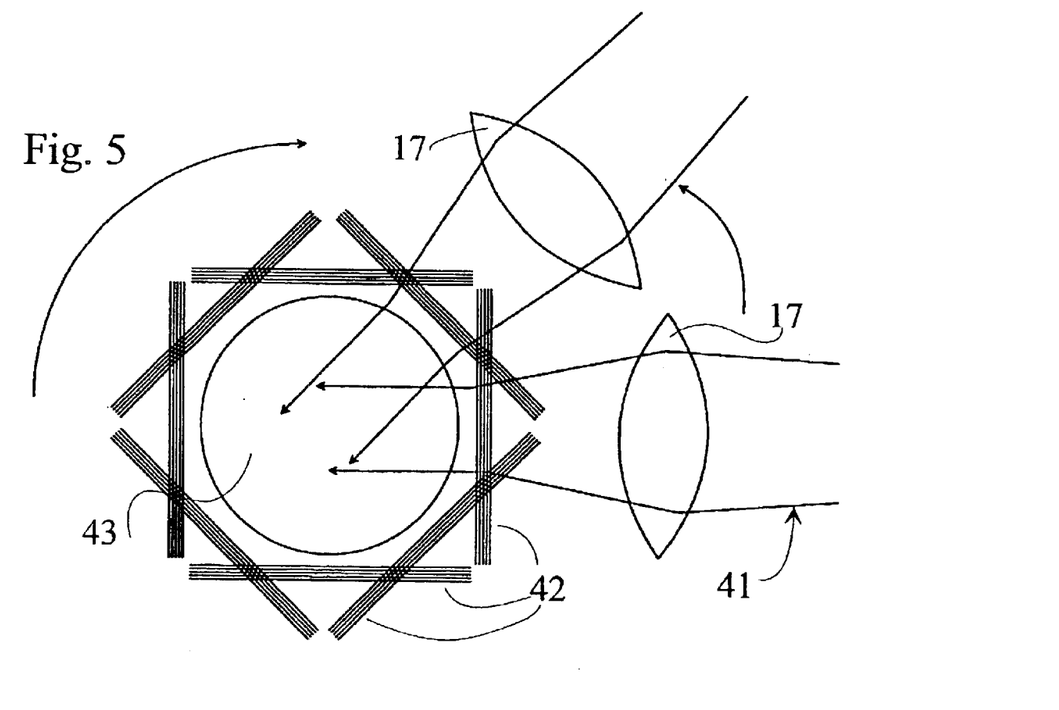
FIG. 5 illustrates the working principle of another embodiment of the data storage arrangement of the invention.
Figure 6:
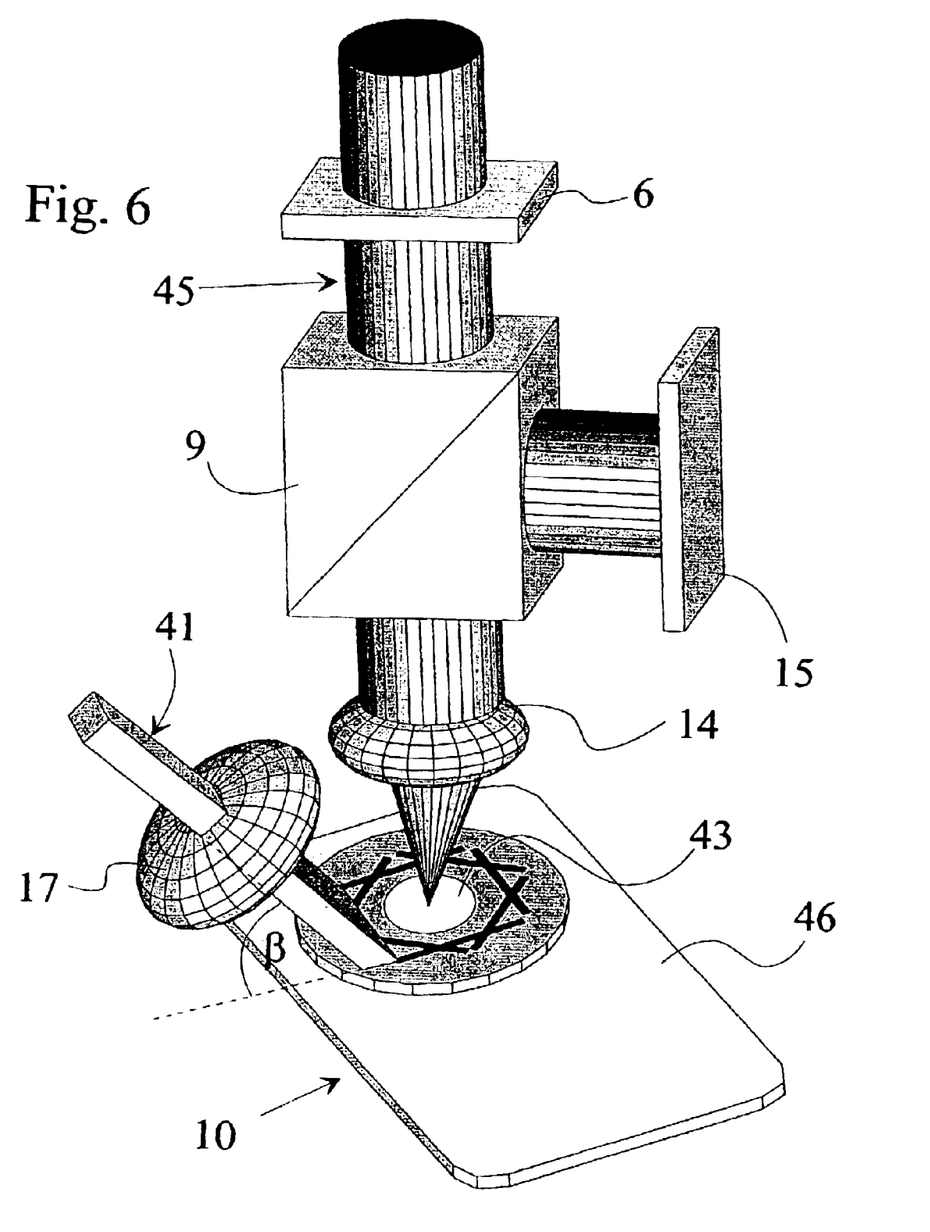
FIG. 6 illustrates the spatial arrangement of the elements of the optical setup of FIG. 4.

Finally, an optical storage system using a card or a disk is presented with reference to FIGS. 5. and 6.

Beside the tape-based storage systems, the multi-layered waveguide holograms are applicable for other known storage systems as well, e.g. for card or disk optical storage systems. The main parameters of the waveguide structure are essentially the same as shown in FIGS. 1 or 2. The differences between the data storage mediums is found in the relative arrangement of the 13 holograms and the coupling gratings 12. The arrangement shown in FIG. 3 is optimal for tape storage applications. With disk data storage devices the 13 holograms are arranged in a circles or along a spiral, in a usual manner. The proper positioning (tracking) of the readout optics is made by a known opto-electronical and opto-mechanical servo system. This system is not described here in detail, but it is known in the art.

For data storage systems having a card-type data storage medium, or an equivalent, essentially stationary storage medium, another grating-hologram arrangement is suggested. With such a data storage card, the storage medium moves much slower than an optical tape. As a result, the readout speed (data transfer rate) is lower. This is alleviated by the fact that normally it is not necessary to read a large amount of data from the card storage mediums, due to the type of the data stored (personal data, bank accounts, personal medical data, etc.). The data transfer rate may increase, if the holograms in the different layers are positioned exactly above each other, and not shifted as with the tape system. After a positioning operation of the card actuator mechanism, a selected hologram in any of the layers may be reached with a fast change of the incidence angle or the direction of the reference beam. The readout speed may be limited by the performance of the readout electronics as well. Therefore, it is preferred to use a readout optics and electronics based on a fast CCD or CMOS photodetectors.

With a possible embodiment of the card-type storage medium the coupling gratings 42 surround the holograms 43 stacked above each other (see FIGS. 5 and 6.). In this case the coupling gratings 42 associated to the different layers are positioned at an angle to each other. This means that all the gratings 42 may have the same profile and the same periodicity. This embodiment is inherently simple, and makes the production of the gratings much cheaper. The addressing of the selected layers is performed by rotating the reference beam 41 around an axis perpendicular to planes of the holograms 43, and going through the common centre of the holograms 43, while the reference beam 42 falls onto the hologram 43 under a given incidence angle β. This perpendicular axis of rotation practically coincides with the optical axis of the object beam 45 (see especially FIG. 6. With other words, the reference beam 41 is rotated around the optical axis of the Fourier-objective 14 with a given tilting angle β. In this manner the reference beam 41 only coincides with one of the gratings 42 at one time, and therefore will be coupled into one layer only with good efficiency. At the same time, the projection of the directions of the different reference beams 41 associated to the different coupling gratings 42 projected onto the plane of the substrate 10 will be different. Note that in FIG. 6, the plane of the substrate 10 essentially coincides with the plane of the card 46 itself. With other words, the differently directed gratings 42 will act as the selective coupling means, co-operating with the reference beams 41 having the proper direction.

Figure 7:
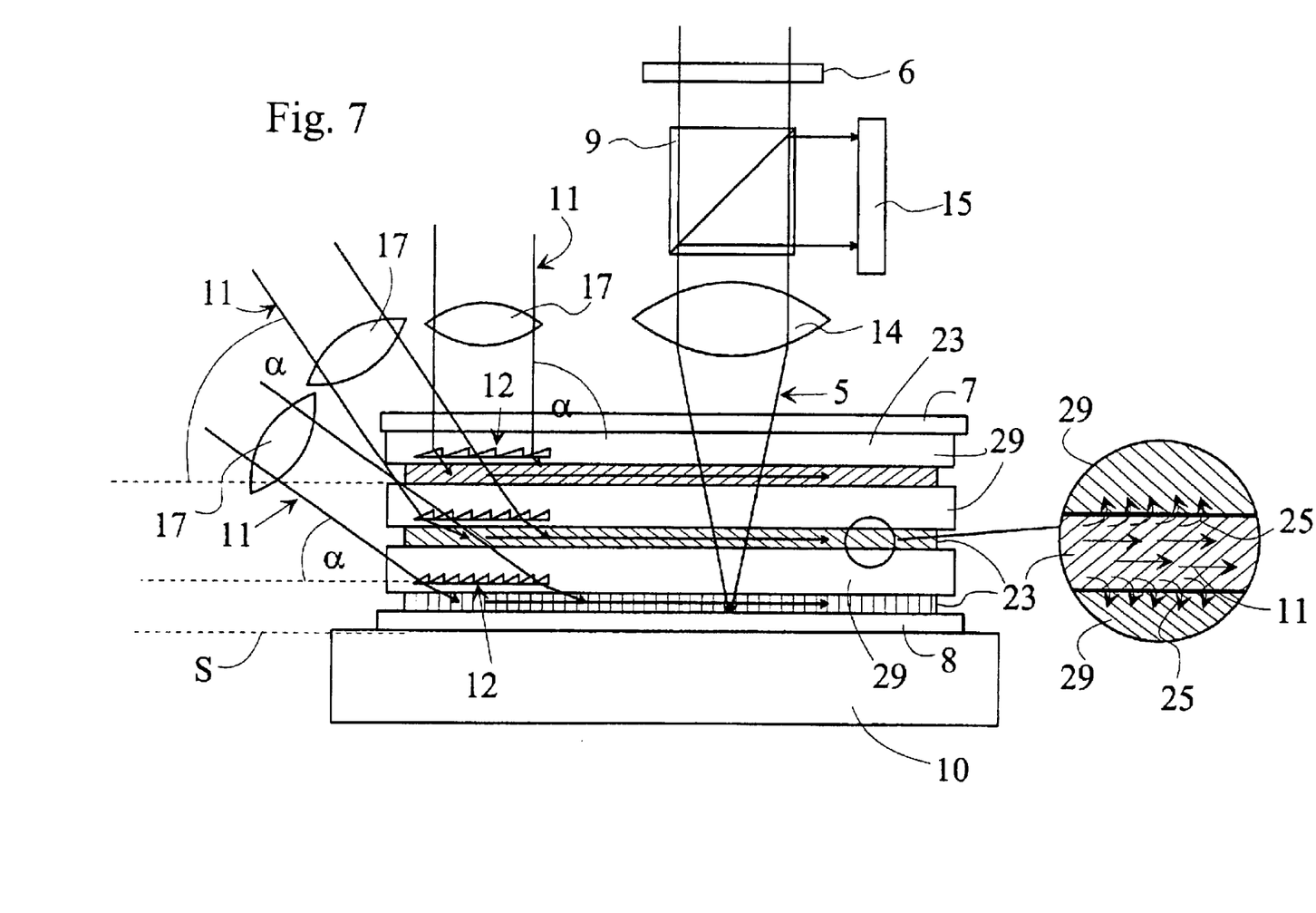
FIG. 7 is another modified version of the optical setup shown in FIG. 2A.

It is also possible to record the stacked holograms using an evanescent reference beam 11 with two types of repeating layers only. Such a waveguide structure is shown in FIG. 7. The optical system for recording and readout is similar to that shown in FIGS. 1A and 2A. There are also provided selective coupling means, the gratings 12 for each waveguide layer 23. However, in this case there is no separate light sensitive layer 24 and a spacer layer 4 in the waveguide structure, and these two layers is substituted by a single light sensitive spacer layer 29 with an approximate thickness of 10 μm. With other words, this system may be regarded as a waveguide structure where the spacer layer itself is suitable for recording of holograms. Here the reference beam 11 will travel in the waveguide layer 23, which is only 1–2 μm thick, and is made of a material that is not sensitive to light. Because of the exponentially decaying evanescent wave 25 the hologram in the thick light spacer sensitive layer 29 will be only formed in the direct vicinity of the waveguide layer 23. If the storage material is sufficiently thick, no coupling between the layers will arise.

The waveguide structure in FIG. 7 also comprises a mirror 8 between the layer stack used for the recording and the substrate 10. However, it is also foreseen to use the waveguide structure of FIG. 7 without a mirror layer 8, and with a transparent substrate 10. In this case, the optical system for recording and readout may be modified similarly to those shown in FIGS. 1B and 2B.

What is claimed is:

1. A method of recording holograms in a waveguide layer structure, the waveguide layer structure containing multiple waveguide layers (3,23), and spacer layers (4,29) separating the waveguide layers (3,23), the index of refraction of the spacer layers being smaller than the index of refraction of the waveguide layers, comprising the steps of recording the holograms in or in the vicinity of each waveguide layer as an interference between an object beam (5,45), the object beam being essentially perpendicular to the plane of the waveguide layer structure and a reference beam (11,41) coupled into said each waveguide layer (3,23), wherein a grating (12,42) is associated to each waveguide layer (3,23) for selectively coupling the reference beam (11,41) into said each single waveguide layer (3,23) of the waveguide layer structure, and wherein the gratings (12,42) are having different pitch and/or profile and/or orientation around the axis perpendicular to the plane of the waveguide layer structure in the different waveguide layers, the reference beam (11,41) is projected onto the gratings (12,42)

a. in different incidence azimuthal angles and/or b. from different directions around an axis perpendicular to the plane of the waveguide layer structure, whore the components of the different directions falling in the plane of a waveguide layer structure are also different.

2. An arrangement for recording and readout of holograms (13,43), comprising a data storage medium (30), the data storage medium comprising a waveguide layer structure, the waveguide layer structure containing multiple waveguide layers (3,23) and spacer layers (4,29) separating thin waveguide layers (3,23), the index of refraction of the spacer layers (4,29) being smaller than the index of refraction of the waveguide layers (3,23), an optical system far writing and reading the holograms (13,43), the optical system comprising means for producing an object beam (5,45) and a reference beam (11,41), the optical system further comprising means for directing the object beam (5,45) and the reference beam (11,41) on the storage medium, the arrangement further comprising gratings (12,42) associated to each waveguide layer (3,23) for selectively coupling the reference beam into said each single waveguide layer (3,23) of the layer structure, characterised in that the grating (12,42) in the different waveguide layers (3,23) are provided with different pitch and/or profile and/or orientation around the axis perpendicular to the plane of the waveguide layer structure, and the optical system comprises means for projecting the reference beam onto the gratings a. in different incidence azimuthal angles and/or b. from different directions around the axis perpendicular to the plane of the waveguide layer structure, the components of the different directions falling in the plane of the waveguide layer structure also being different.

3. The arrangement according to claim 2, comprising a tape (30) as the data storage medium.

4. The arrangement according to claim 3, characterised in that the optical system (33) is positioned in a rotating cylinder (34), where the cylinder is guiding the tape (30).

5. The arrangement according to claim 4, characterised in that there are provided multiple optical systems (33) within the cylinder (34).

6. The arrangement according to claim 3, comprising a card as the data storage medium.

7. The arrangement according to claim 5, comprising a card as the data storage medium.

8. The arrangement according to claim 7, characterised in that the optical system is adapted for rotating the reference beam (41) around an axis perpendicular to the plane of the holographic storage layer.

9. A waveguide layer structure comprising holographic storage layers sensitive to light, the layer structure further comprising a substrate (10) and multiple waveguide layers (3,23) and spacer layers (4,29) separating the waveguide layers (3,23), the index of refraction of the spacer layers (4,29) being smaller than the index of refraction of the waveguide layers (3,23), gratings (12,42) associated to each waveguide layer for selectively coupling a reference beam into a single waveguide layer (3,23) of the waveguide layer structure, characterised in that in the different waveguide layers (3,23) the gratings (12,42) have different orientation around the axis perpendicular to the plane of the waveguide layer structure and/or different pitch and/or different profile.

10. The waveguide structure according to claim 9, comprising a mirror layer (8) between the substrate (10) and a waveguide layer (3,23) adjacent to the substrate (10).

11. The waveguide structure according to claim 10, wherein the substrate is a is transparent substrate (10).

12. The waveguide structure according to claim 10, characterised in that the holographic storage layer is a waveguide layer (3).

13. The waveguide structure according to claim 10, comprising at least one separate holographic storage layer (24) adjacent to each waveguide layer (23).

14. The waveguide structure according to claim 10, characterised in that the holographic storage layer is a spacer layer (29).

15. The waveguide structure according to claim 9, wherein the substrate is a transparent substrate (10).

16. The waveguide structure according to claim 15, characterised in that the holographic storage layer is a waveguide layer (3).

17. The waveguide structure according to claim 15, comprising at least one separate holographic storage layer (24) adjacent to each waveguide layer (23).

18. The waveguide structure according to claim 9, characterised in that the holographic storage layer is a waveguide layer (3).

19. The waveguide structure according to claim 9, comprising at least one separate holographic storage layer (24) adjacent to each waveguide layer (23).

20. The waveguide structure according to claim 9, characterised in that the holographic storage layer is a spacer layer (29).

21. The waveguide structure according to claim 9, comprising a protective layer (7) on an external surface of the layer structure.

* * * * *